Feb. 7, 1933.　　　A. A. MacDONALD　　　1,896,243
CUTTER SUPPORT FOR WELL DRILLS
Filed April 12, 1928

A. A. MAC DONALD  INVENTOR

BY  *Jesse R. Stone*

ATTORNEY

Patented Feb. 7, 1933

1,896,243

UNITED STATES PATENT OFFICE

ARCHIE A. MacDONALD, OF LOS ANGELES, CALIFORNIA, ASSIGNOR TO HUGHES TOOL COMPANY, OF HOUSTON, TEXAS, A CORPORATION OF TEXAS

CUTTER SUPPORT FOR WELL DRILLS

Application filed April 12, 1928. Serial No. 269,351.

My invention relates to cutters employed in well drilling and pertains particularly to means employed in retaining the cutters upon the drill head.

An object of the invention is to provide means for securing the cutters firmly in position with a minimum of difficulty and manipulation.

It is desired to make the cutter shafts removable from the drill head and to form the drill head to readily receive the shafts and to provide means on the head to secure the shafts in position.

The construction of the shaft locking means whereby the said shaft is locked securely in position with a minimum of difficulty is an important feature of the invention.

Figure 1:
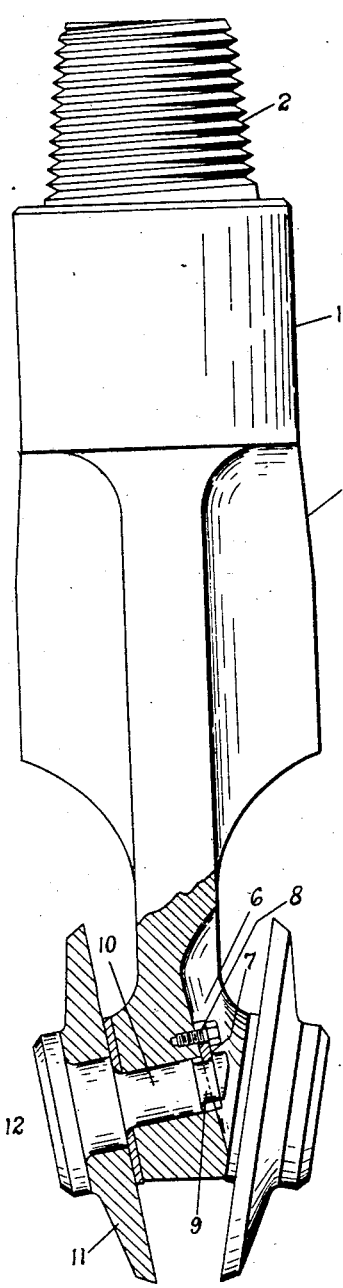
Figure 2:
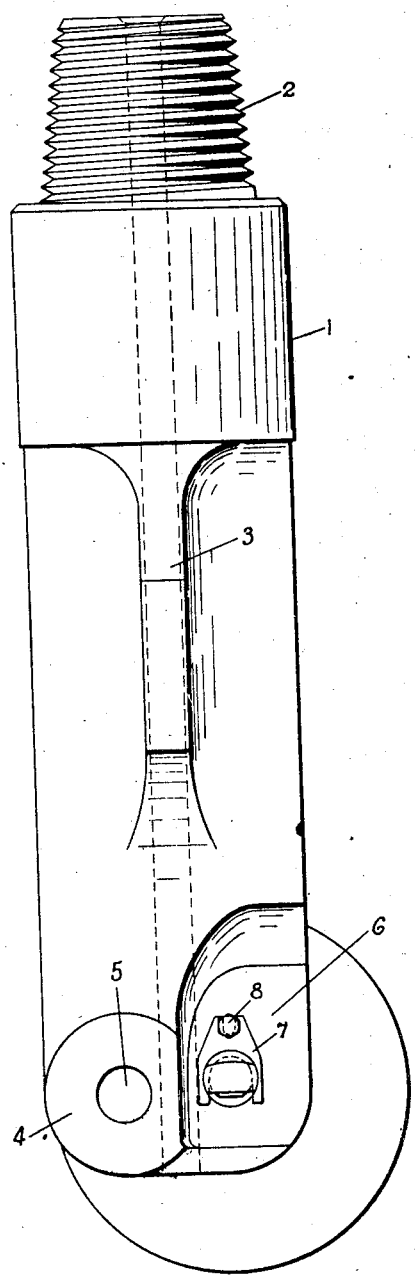

Referring to the drawing herewith, Fig. 1 is a front view of a drill bit embodying the invention, certain portions of the drill head and cutter being broken away for greater clearness. Fig. 2 is a side elevation thereof with one cutter removed from the head. The invention is particularly applicable to disc bits and I have shown the same as applied to a disc bit of common construction modified to adapt it to employ the shaft locking device.

The head 1 of the drill has a threaded upper shank 2 for engagement with a drill collar. The lower portion of the head is flattened and has opposite reaming blades 3 to assist in maintaining the gauge of the hole.

The lower end of the head is increased slightly in thickness and has two opposed downwardly converging faces 4, which are offset slightly relative to each other. Each of these faces 4 has a circular contour with a shaft receiving opening 5 centrally thereof and extending entirely through the head.

The shaft openings terminate on the side away from the cutter in a shallow recess or pocket 6, which has an inner wall inclined to be approximately parallel with the face 4 opposite thereto. The opening 5 is of uniform diameter and terminates in the pocket 6, and the wall of the pocket adjacent the opening has a locking plate 7, the upper end of which may be fixed to the head by a cap screw 8. The lower end of the plate is forked to straddle the end 9 of the cutter shaft 10.

The cutter shaft is shaped to form a bearing for the disc-shaped cutter, 11. It has an outer head 12, and adjacent thereto is a bearing surface of smaller diameter to receive the cutter. The body of the shaft within the head fits the opening 5. At the outer end of the shaft within the recess 6, there is formed a circumferential groove to receive the locking plate 7.

Said plate 7 is wedge shaped and when the cutter is mounted upon the shaft and the shaft is inserted through the opening 5 in the head, the plate 7 will be driven downwardly between the wall of the recess 6 and within the groove in the shaft so as to engage against the outer shoulder of the groove and force the shaft firmly into position. The cap screw is then employed to retain the locking plate in position during the operation of the drill.

This locking means has the advantage of being easily and quickly fixed in position or later released when the shaft is to be removed.

Having thus described my invention, what I claim as new is:

1. In a well drill, a head flattened at its lower end, cutter shafts fitting through openings in said lower end, and projecting beyond said head, one projecting end of said shaft having a circumferential groove therein, removable latching means on said head engaging in said groove to retain said shaft in said head and cutters on said shafts.

2. In a well drill, a head, cutter shafts fitting within openings in the lower end thereof, a head on one end of each shaft, the other end projecting through said head, said shafts being unthreaded and having circumferential grooves in their projecting ends, shaft engaging means on said drill head adapted to be received in said grooves to retain said shafts in position comprising slotted plates shaped to engage in said grooves and to be locked in position therein and drill cutters on said shafts.

3. In a well drill, a head, cutter shafts fitting within openings therein, a bearing on one end of each of said shafts, the other end projecting through said head, cutters on said bearings and a plate slotted to engage the said projecting end of said shaft and hold said shaft against longitudinal movement and means to lock said plate in shaft-engaging position.

4. In a well drill, a head, cutter shafts fitting within openings therein, a bearing on one end of each of said shafts, the other end being smaller and projecting through said head, cutters on said bearings, the projecting ends of said shafts being circumferentially grooved, wedge-shaped plates slotted to engage in said grooves and wedge between said ends of said shafts and said head, and means to fix said plates in shaft-engaging position.

5. In a well drill, a head, cutter shafts fitting within openings therein, a bearing on one end of each of said shafts, the other end being smaller and projecting through said head, cutters on said bearings, said projecting ends being circumferentially grooved, wedge-shaped plates adapted to engage in said grooves and fix said shafts in position, and cap screws to hold said plates in shaft-engaging position.

In testimony whereof I hereunto affix my signature this 28th day of March, A. D. 1928.

ARCHIE A. MacDONALD.